United States Patent [19]
Amburgey

[11] 3,952,453
[45] Apr. 27, 1976

[54] SAFETY BARRIER

[76] Inventor: Ossie Amburgey, 28445 Weddell, Trenton, Mich. 48183

[22] Filed: May 31, 1974

[21] Appl. No.: 475,349

[52] U.S. Cl. ................................. 49/34; 248/228; 248/230; 403/233; 256/59
[51] Int. Cl.² .......................................... E01F 13/00
[58] Field of Search ............... 182/113; 49/34, 50, 49/55, 57, 124; 248/228, 230, 72, 251, 102, 105; 211/182, 105.1, 105.4; 256/22, 59; 403/233

[56] References Cited
UNITED STATES PATENTS

| | | | |
|---|---|---|---|
| 389,206 | 9/1888 | Delany | 256/22 |
| 1,241,364 | 9/1917 | Ferris | 49/34 |
| 2,380,379 | 7/1945 | Attwood | 248/228 UX |
| 3,254,528 | 6/1966 | Michael | 248/228 X |
| 3,301,513 | 1/1967 | Sugaya | 248/228 X |
| 3,351,311 | 11/1967 | Melfi | 248/251 X |

Primary Examiner—Kenneth Downey
Attorney, Agent, or Firm—Behr & Woodbridge

[57] ABSTRACT

An improved portable Safety Barrier may be used to prevent accidental entry into dangerous areas. According to a preferred embodiment the barrier comprises a bar means and a pair of attaching means, typically clamps, connected at the two ends of the bar means. A C-type clamp may be employed to connect the bar means to a U-shaped support or a two plate clamp means may be used to attach the bar to the point where two U-shaped struts converge in a T. The attaching means can also comprise a shackle type clamp for attachment to rounded objects or it may be a pointed tip suitable for attachment to a surface having receiving holes therein.

The bar means may comprise a telescoping assembly in which one member is slideably received in the other so that the length of the assembly is adjustable to match various width passageways. Alternatively, two pipes or bars of different diameters may be attached together by a suitable diameter reducing means. According to another embodiment, the barrier may comprise a cord and a clamp means which fastens on to said cord means in a highly secured fashion. A universal, rectangular type of clamp may be used in place of several of the foregoing embodiments if versatility is desired. It is an object of this invention to provide safety barriers which conform to OSHA regulations and which are also inexpensive and dependable.

8 Claims, 22 Drawing Figures

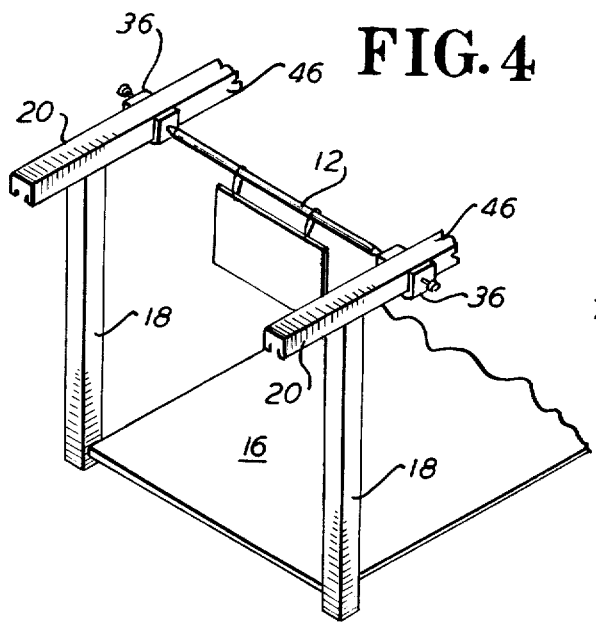
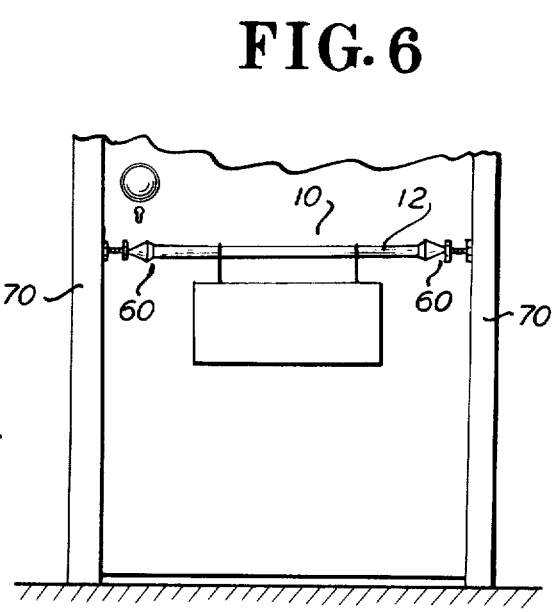
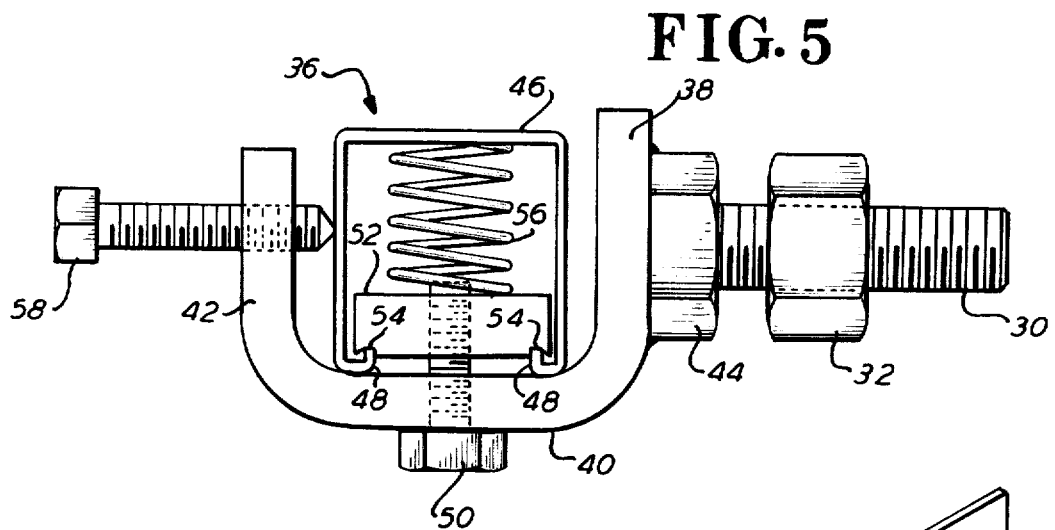
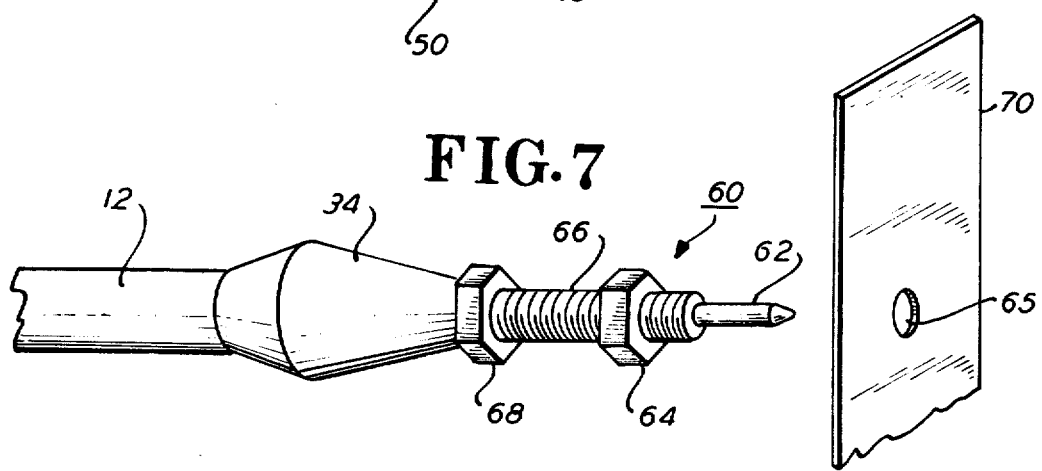

FIG. 10
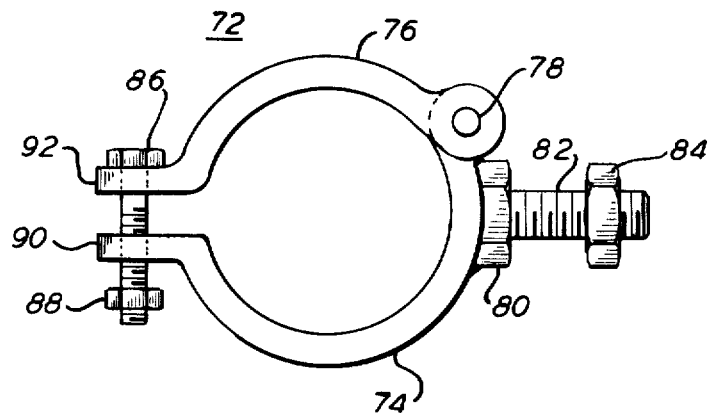
FIG. 11
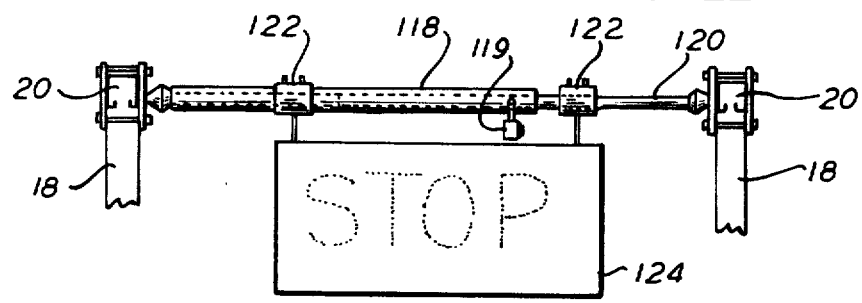
FIG. 12
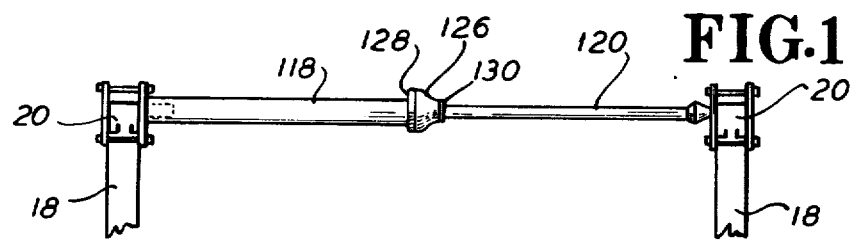
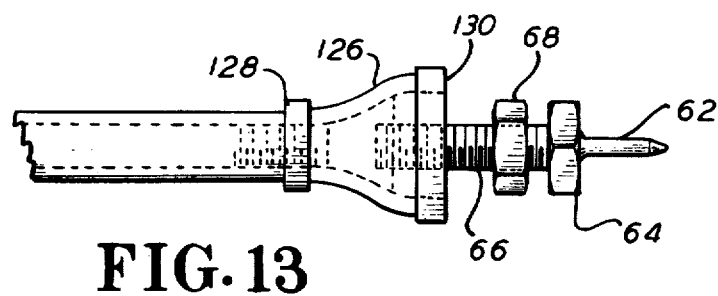
FIG. 13

SAFETY BARRIER

BACKGROUND OF THE INVENTION

1. Field of the Invention

This invention relates to safety barriers in general and in particular to a variety of portable safety barriers which may be selectively attached across a restricted passageway.

2. Description of the Prior Art

Typical of prior art bar barriers is, for instance, Delany U.S. Pat. No. 389,206 which discloses the use of a guard bar to prevent entry into a basement stairwell. That particular bar may be locked in position and then subsequently slid out of the way. Typical also are Claus U.S. Pat. No. 1,891,588 and Bolton U.S. Pat. No. 3,648,4225. The Claus patent discloses a window safety bar which telescopes to fit windows of varying widths. Similarly, Bolton discloses an adjustable bridging device which is extensible and which includes a pointed end. Of interest, also, is Cleveland U.S. Pat. No. 3,425,165 which discloses an extensible gate for preventing accidental spills down open elevator shafts.

With regard to a cord type barrier, the following examples of prior art are of particular interest: U.S. Pat. Nos. Garrett et al 3,408,771 and Ellison 2,663,103. Garrett et al is significant because it discloses the use of a rope or cord for excluding unwanted traffic from an isle.

In view of the foregoing, it is clear that the use of a simple bar or cord for preventing undesired traffic through a passageway or up or down a stairwell is known in the prior art. However, the advent of new safety requirements as, for instance, spelled out in recent OSHA regulations make such simple expedients obsolete.

The OSHA regulations dealing with floors, wall openings and stairways, may be found in Part 1926, Subpart M, Sections 1926.500-1926.502 of Title 29 of the Code of Federal Regulations. The foregoing regulations may also be found reprinted in the Federal Register, Volume 37, No. 243, Saturday Dec. 16, 1972 at Pages 27543-27545. Besides imposing rigid regulations as to the dimensions of stairwell barriers, the OSHA regulations also impose a minimum 200-pound top rail pressure on safety barriers. It is doubtful if many of the prior art type safety barriers could successfully meet the requirements set forth in the new OSHA Federal Regulations. Not only does the present invention meet and surpass the OSHA requirements, the present invention is also highly adaptable for use in wide variety of environments.

A specific problem solved by this invention is that posed by the use of Unistrut U-shaped channels such as found in many powerhouses and often found in temporary structures under construction. (Unistrut is a trademark of the Unistrut Corporation of Wayne, Mich.) As a matter of fact, there may be up to a mile or more of U-type strut or 1⅝ inches pipe support in the framework of a powerhouse whose outside structure may range up to 13 stories in height. Because there are no opposing walls, most prior art devices are inadequate. Additionally, barriers have to be much stronger than previously developed and have to be rigidly securable to U-strut supports. Moreover, such barriers have to be virtually tamper-proof and extensible so that they can fit in passageways of varying widths. It was in the context of the foregoing requirements that the following device was invented.

SUMMARY OF THE INVENTION

The preferred embodiment of the present invention consists essentially of a barrier means which may be either a rigid bar or cord and an attaching means. According to one embodiment, a rigid barrier is secured to a U-shaped strut support by means of a modidied C-type clamp. The C-type clamp is available from the Unistrut Corporation and includes a bolt and locking plate mechanism constructed to engage the turned-in ridges on the interior of the Unistrut. This type of device is especially suitable for attaching along any point on a U-strut.

According to another embodiment, the attaching means takes the form of a first and second plate which are connected together by three bolts. This particular clamp is suitable for attachment to the point at which two U-shaped struts form a T, such as on a stairwell. In this mode, the conjunction between the struts is sandwiched between the two plates and the bolts are then fastened so as to absolutely prevent any sliding of the safety barrier. By strategically locating the bolts on opposite sides of the Unistrut, it is virtually impossible for the barriers to be moved or tampered with. Additionally, the barrier device may include a telescoping section or it may include the use of two pipes of different diameters connected together by a diameter reducing means. Also, the bar may be attached to a rounded support by a shackle-like clamp or it may be attached to flat surfaces by means of pointed tips.

In a further embodiment, the barrier portion comprises a cord of rope which may be fastened across a stairwell or passageway. At one or both ends of the cord is a clamp means which readily attaches itself to a U-shaped strut or similar support. The clamp means includes an eyelet and saddle means which, when the cord is threaded through the eyelet, clinches the rope and holds it securely.

A universal, rectangular type of clamp which incorporates many of the features of the foregoing clamps may be used in most of the foregoing situations. The clamp comprises a base means, a pair of side means and an end means which may box in a U-strut or a rounded or virtually any shape column. The clamp may be secured to the support means either through the use of a pulling type locking plate or a pushing type locking plate or by a screw. The universal clamp is further supplied with a pressure plate which in conjunction with the end plate may be used to pinch a cord and thereby hold it secure.

It is therefore an object of the present invention to provide a portable safety barrier which will effectively and safely exclude traffic from restricted passageways and stairwells.

It is another object of the present invention to provide a portable safety barrier including a C-type clamp which is attachable to U-strut railing.

It is a still further object of the present invention to provide a portable safety barrier which includes an attaching means comprising two flat plates. The two flat plates may be bolted on opposite sides of a T type junction between U-struts in such a fashion as to absolutely prevent any sliding motion of the safety barrier.

It is an even further object of the present invention to provide a safety barrier which includes a clamping means suitable for attachment to a cylindrical support.

It is another object of the present invention to provide a safety barrier with pointed tips which may be attachable to flat surfaces having suitable receiving holes therein.

It is also an object of the present invention to provide a cord type safety barrier including an adjustable clamp at least one end thereof.

It is also a further object of the present invention to provide a universal type of barrier which can clamp onto many different types of surfaces, thereby eliminating the need for many different type of clamps.

These and other objects and advantages of the invention will be more fully understood upon a reading of the following specification taken in view of the attached drawings.

BRIEF DESCRIPTION OF THE DRAWINGS

FIG. 4 is a perspective view of the safety barrier with a C-type clamp in position across a passageway.

FIG. 5 is a cross sectional view of the C-type clamp shown in FIG. 3 in position on a Unistrut support.

FIG. 6 is a perspective view showing a safety barrier including point type attaching means situated across the entrance to a passageway.

FIG. 7 is an exploded view of the point type attachment means shown in FIG. 6.

FIG. 10 is a plan view of a shackle-type clamp suitable for attachment to round objects.

FIG. 11 is a perspective view of the safety barrier of the present invention showing two telescoping sections in the extended mode.

FIG. 12 is a perspective view of a safety barrier according to the present invention including a reducing means for connecting pipes of different diameters.

FIG. 13 is a perspective, cross-sectional view of a safety barrier according to the present invention and including an adjustable tip means for insertion into an appropriate receiving hole.

BRIEF DESCRIPTION OF THE INVENTION

During the course of the following description, like numbers will be used to indicate like elements as shown in the different view of FIGS. 1 through 21.

Figure 1:
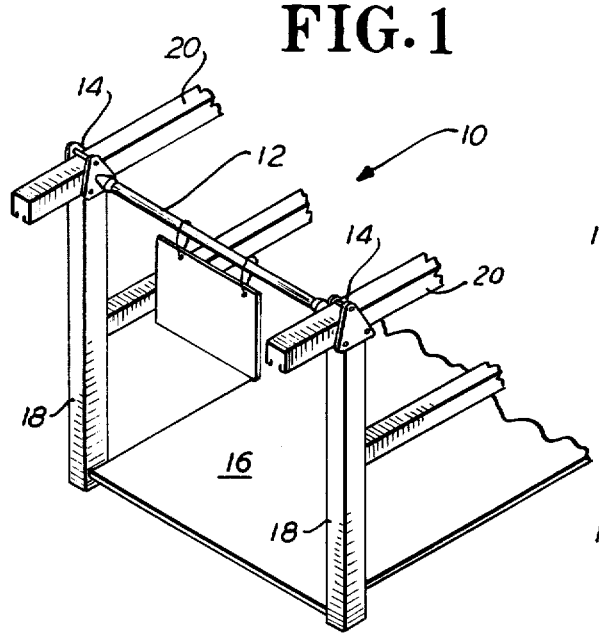
FIG. 1 is a perspective view showing a safety barrier with a two-plate clamp in position on a level restricted passageway.

The safety barrier 10 of the present invention is shown in FIG. 1 to include a bar means 12 and a pair of clamp means 14. According to this view, the safety barrier 10 extends across the railing supports of a level passageway or catwalk 16. The passageway 16 includes a railing section having vertical supports 18 and a horizontal handrail 20. Clamp means 14 is strategically located at the junction of vertical support 18 and hand rails 20. At that point the support and rail for a T. It has been found that by sandwiching both sides of the T, it is possible to make the safety barrier virtually immobile.

Figure 2:
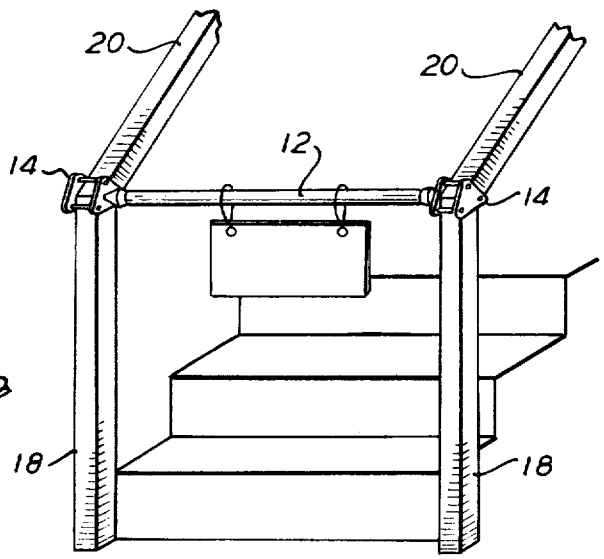
FIG. 2 is a perspective view of the same twoplate clamp safety barrier in position at the entrance to a stairwell passageway.

While the two plate pipe clamp shown in FIG. 1 lends itself nicely to attachment at the T intersection of a rail and a support, nevertheless it may be located at a wide variety of other locations top. FIG. 2 shows the two-plate clamp safety barrier connected across the entrance of a stairwell. Note in this particular configuration that the hand rail 20 and the vertical support 18 intersect at an oblique angle with respect to one another. In FIG. 2, the clamps are situated at the intersection of the vertical support 18 and the hand rail 20, but in this case the supports and handrail do not form a T intersection. FIGS. 1 and 2 show the wide adaptability of this particular type of safety barrier and clamp means. While vertical supports 18 are shown to be 1⅝ inches U-type channels, it will be understood that 1⅝ inches pipe or the like might be used instead.

Figure 3:
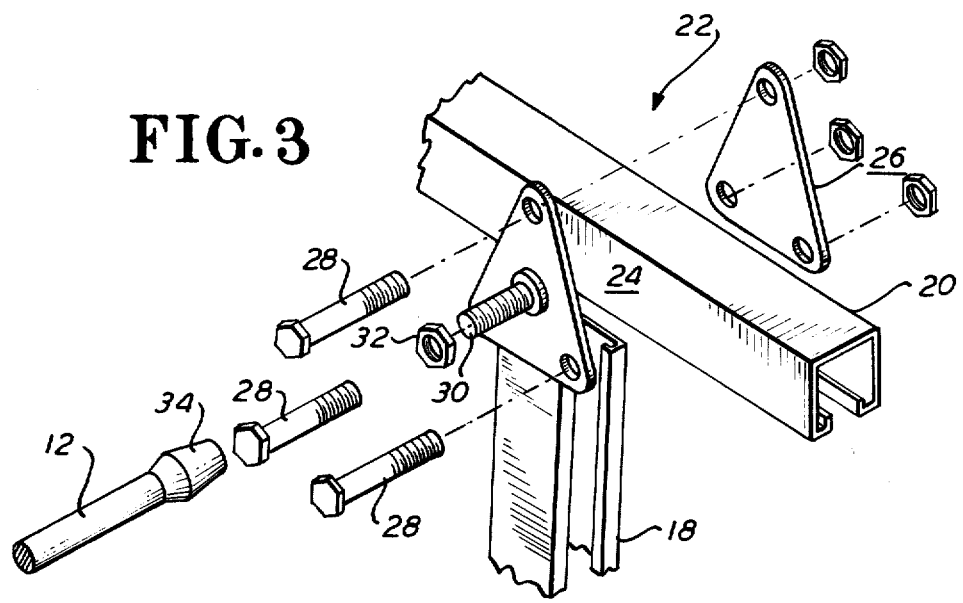
FIG. 3 is a partially exploded view of the two-plate clamp illustrated in FIGS. 1 and 2.

Details of the construction of the two-plate clamp are shown in FIG. 3. The two-plate clamp 22 consists essentially of a first inwardly facing triangular plate 24, a second outwardly facing triangular plate 26 and a plurality of connecting bolts 28. The bolts 28 are situated at the apexes or tips of the triangular plates 24 and 26. The two-plate clamp is located at the T intersection of the vertical support 18 and hand rail 20. By placing at least one bolt above the rail 20 and the other two remaining bolts on either side of the vertical support 18, it is possible to completely immobilize the clamp and safety bar means 12 connected thereto.

The first, inwardly facing, triangular plate 24 includes a threaded stud 30 and a locking nut 32. The stud 30 is receivable in the spear-shaped head 34 of the bar means 12. The shape of the spear-shaped head 34 facilitates being hand held or hand tightened. The head 34 is attached to the stud 30 by rotating the head against the stud 30 until it rotates no further. At that point, locking nut 32 may be rotated against head 34 to secure the bar means in that position. The structure of the two-plate clamp 22 makes it particularly adaptable for attachment to flat surfaces, succh as U-shaped struts, which are typically found in powerhouses and temporary building construction. Obviously, the clamp 22 can be located anywhere along a flat railing but it has been found to be most stable at the T intersection of a vertical support and a handrail. By sandwiching the railing between the two clamps, it is possible to adjust for railings of different and varying widths.

Another embodiment of the safety barrier 10 is shown in FIG. 4. The bar means 12 is essentially the same as previously described but the C-type clamping means 36 differs in some respects from the two-plate clamp 22. The C-type clamp 36 is especially adapted for attachment to U-shaped struts.

A modified C-type clamp is shown in detail in FIG. 5. The C type clamp includes a bottom section 38, a middle section 40 and a top section 42. The bottom section is attached to a threaded stud 30 and includes a locking bolt 32 similar to those previously described with respect to FIGS. 1, 2 and 3. The stud 30 is rigidly connected to the bottom section 38 of C clamp 36 via a boss 44. The clamp of FIG. 5 is shown to be connected in cross section to a Unistrut 46. Strut 46 is a U-shaped in cross section and includes a pair of turned-in ridges 48. A locking mechanism comprises a threaded bolt 50 and a locking plate 52. The locking plate 52 includes a pair of parallel grooves 54 adapted to receive the turned-in ridges 48 of the U-strut. A spring 56 helps to urge locking plate 52 into engagement with the ridges 48. Threadably received by the top section 42 of the C-clamp is a threaded bolt 58 including a pointed tip. C-type clamps are commercially available, but they do not generally include the locking plate means and threaded stud means illustrated in FIG. 5.

In order to fasten the C-clamp 36 to strut 46 it is only necessary to slip the locking plate underneath the ridges 48 and slide the whole assembly into position. Securing is achieved by turning the threaded bolt 50 until the locking plate 52 is in secure engagement with the turned-in ridges 48. Additional security is provided by threaded bolt 58 which helps to ensure against lateral movement.

An additional embodiment according to the same basic invention is shown in FIGS. 6 and 7. FIG. 6 shows a safety barrier 10 spanning a doorway. In this embodiment the bar means 12 is similar to that previously disclosed but the attaching means herein comprise an adjustable pointed tip.

The adjustable pointed tip means is shown in exploded detail view in FIG. 7. Tip means 60 includes a pointed end 62, a hexagonal shoulder 64 and a threaded stud section 66. The stud section 66 is receivable in the head section 34 of the bar means 12 in a manner similar to that shown with regard to FIGS. 3 and 5. Additionally, a lock nut 68 permits the pointed tip means 60 to be locked in an infinite variety of extended positions. As seen in FIG. 6, the safety barrier extends across two vertical braces 70 on either side of a doorway. The pointed end section 62 of the tip means 60 are received in holes 65 drilled through the vertical doorway braces 70. Holes 65 can be seen in exploded perspective in FIG. 7. The safety barrier 10 is attached across the vertical doorway braces by first sticking one end of the safety barrier tip means 60 into the hole 65 on the one brace and then locating shoulder means 64 so as to extend the other tip into the hole on the other brace. After the plates have been extended up to the hilt of shoulder 64 they are then secured in that position by lock means 68 in a fashion similar to that employed with the use of lock nut 32 on threaded stud 30 as previously described.

While not shown in FIG. 6, it is clear that the bar can be expanded by telescoping one side into the other. Such a technique will be discussed in more detail with reference to FIG. 11.

Figure 8:
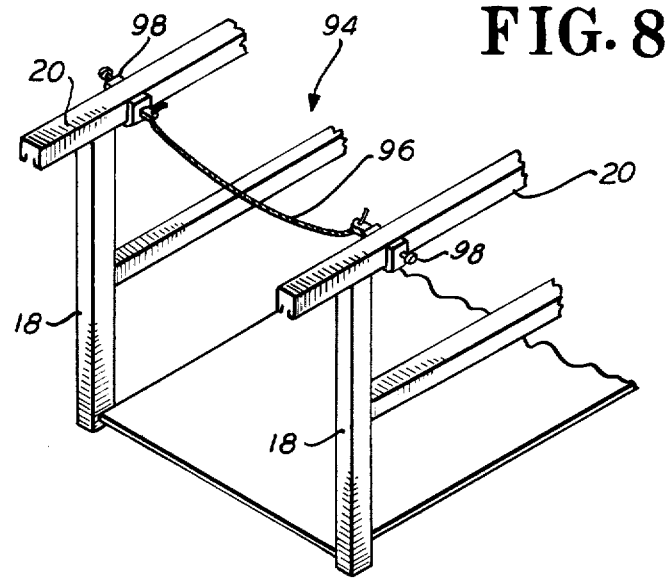
FIG. 8 is a perspective view of the cord-type safety barrier in position across a passageway.

A cord-type barrier is shown in FIG. 8 to extend across a restricted passageway in a manner similar to that described above. The core barrier 94 includes a cord or rope means 96 and a pair of cord clamps 98. One end of cord clamp 98 attached securely to any suitable rigid support and the other end of the clamp grasps onto the rope menas 96 in a vice-like fashion.

A cord clamp 98 according to a preferred embodiment of the present invention is shown in detail in FIG. 9.

Figure 9A:
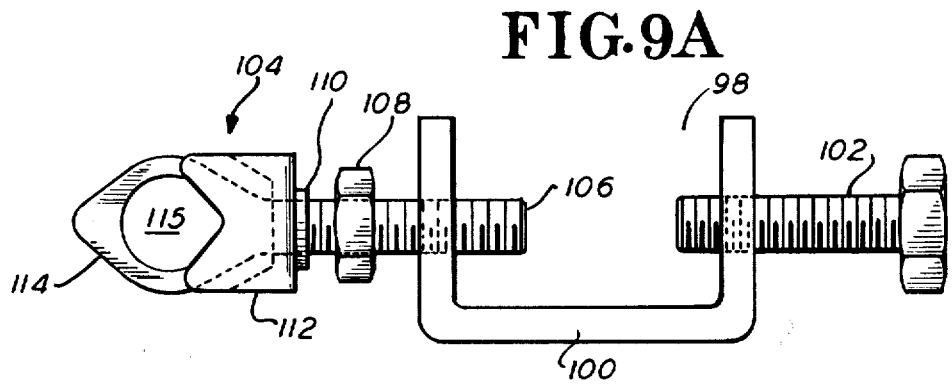
FIG. 9A is a perspective view of the cord clamp shown in FIG. 8.
Figure 9B:
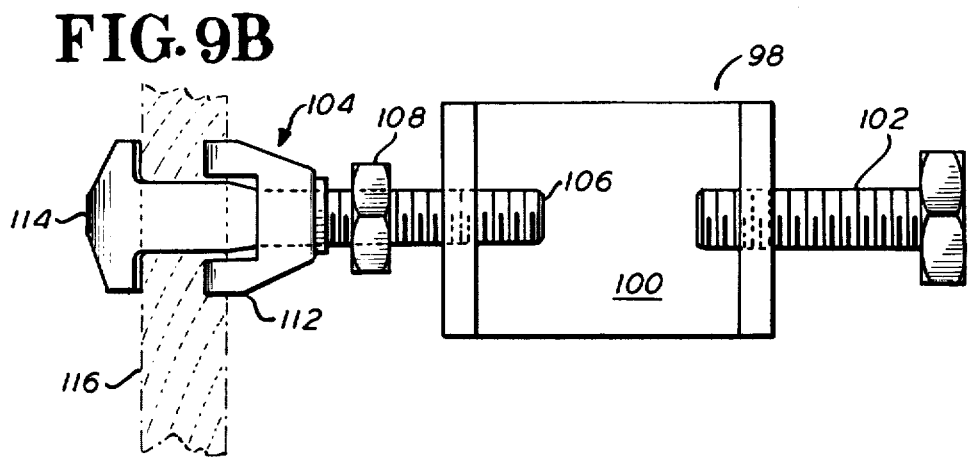
FIG. 9B is a top plan view of the cord clamp of FIG. 9A.

According to FIGS. 9A and 9B, cord clamp 98 is shown to include a U-shaped bracket 100 and threaded locking bolt 102 engaged at one end thereof. At the other end of the U bracket is a cord gripping means 104. The cord gripping means includes a threades stud 106, a locking nut 108, a washer 110, a saddle means 112 and an eyelet means 114. FIG. 9A is a vertical perspective of the cord clamp 98 while FIG. 98 is a top plan view of the clamp shown in FIG. 9A. The cord means 116 is shown in phantom in FIG. 9B as extending through the hole 115 in the eyelet 114.

The cord barrier is erected by fastening the cord clamp 98 to a suitable support means and then tightening threaded bolt 102 down thereon. Once the bracket is securely attached to the support, a rope is laced through the hole in the eyelet 114. The hole 115 is the gap that exists between eyelet 114 and the saddle 112. Once the rope or cord has been threaded therethrough, the saddle 112 is drawn up against the eyelet 114 by the action of tightening the locking nut 108. This pinches the cord between the saddle 112 and the eyelet 114 and causes it to be securely held therebetween.

A type of clamp suitable for attachment onto supports or railings with a round cross section is shown in FIG. 10. The round clamp 72 acts like a shackle and includes a first semi-circular half 74 and a second half 76 joined together by a hinge means 78. One half of the shackle includes a bar 80, a threaded stud 82 and a lock nut 84. The stud 82 is constructed to attach to spear-shaped head 34 in the manner previously described with respect to FIGS. 3, 5 and 7. Additionally, lock nut 84 acts in the same manner as lock nut 32 and 58 as previously described. A threaded locking bolt 86 passes through extended portions 90 and 92 of the first and second crescent section 74 and 76 respectively, and is received by associated nut 88.

The round clamp 72 is easily attached to a round support by separating the two halves 74 and 76, slipping the clamp around the support and then drawing the two halves together by means of locking bolt 86 and nut 88 until the clamp securely pinches the support means between the crescent halves.

As mentioned previously, it is possible to extend the safety barrier bar means 12 if one pipe is telescoped into the other. FIG. 11 shownes such an arrangement wherein a pipe of larger diameter 118 receives another pipe of smaller diameter 120 through the center thereof. In this case obviously the inside diameter of pipe 118 is slightly larger than the outside diameter of pipe 120. Additionally, a pair of collars 122 are shown supporting a hazard sign 124. Collars 122 are free to rotate around the pipes 118 and 120. Since collans 120 are free to rotate, the pendent sign 124 will always hand vertically therebelow under the influence of gravity. In this manner the sign is always most conspicuous to the potential user of the passageway. Pipe 118 can be rigidly secured to pipe 120 by drilling a hole through the overlapping pipe region and then passing a bolt or a lock 119 therethrough.

It is also possible to extend the pipe barrier 12 in a manner such as that shown in FIG. 12. Again pipe 118 is of larger diameter than pipe 120. The two different diameter pipes are connected together via a threaded diameter reducer 126. The threaded reducer 126 includes one threaded opening 128 for receiving the threaded end of large diameter pipe 118 and another threaded opening 130 for receiving a smaller diameter pipe 120. According to the techniques shown in FIGS. 11 and 12, it is possible to easily span passageways of varying widths.

The reducer disclosed in FIG. 12 may be used in conjunction with a pointed tip means 60 such as shown in FIG. 13. The cross-sectional view of the pointed tip means as shown in FIG. 13 discloses in detail the manner in which the reducer 126 is connected to the safety barrier pipe. Note that while a pointed tip means 60 is shown attached to reducer 126, it will be appreciated that the reducer 126 may be used to connect many different types of clamps to barriers of different thread size.

Various view of the universal, rectangular safety barrier clamp are found in FIGS. 14–21. A universal safety barrier clamp 132 is shown in perspective in FIG. 14. Clamp 132 includes a threadess stud 30 and boss 44 similar to those shown in FIG. 5. The boss 44 is connected to the base means 134 which is rigidly and continuously connected to a pair of side means 136. And end means 138 is attached to side means 136 by a pair of Allenhead bolt means 140. A securing bolt 144 is shown to have a tapered tip 146. It will be understood that the tip 146 may be pointed or substantially pointed in order to improve its bite into the support handrail. The universal clamp of FIG. 14 may be secured to a support either by means of securing bolt 144 or through the use of Allenhead bolt means 140 or through the use of both together. The clamp of FIG. 14 has the advantage that it is easy to connect to U-shaped strut type supports, but has the disadvantage that it is not as versatile as other types of universal safety barrier clamps as will be described in detail below.

Figure 14:
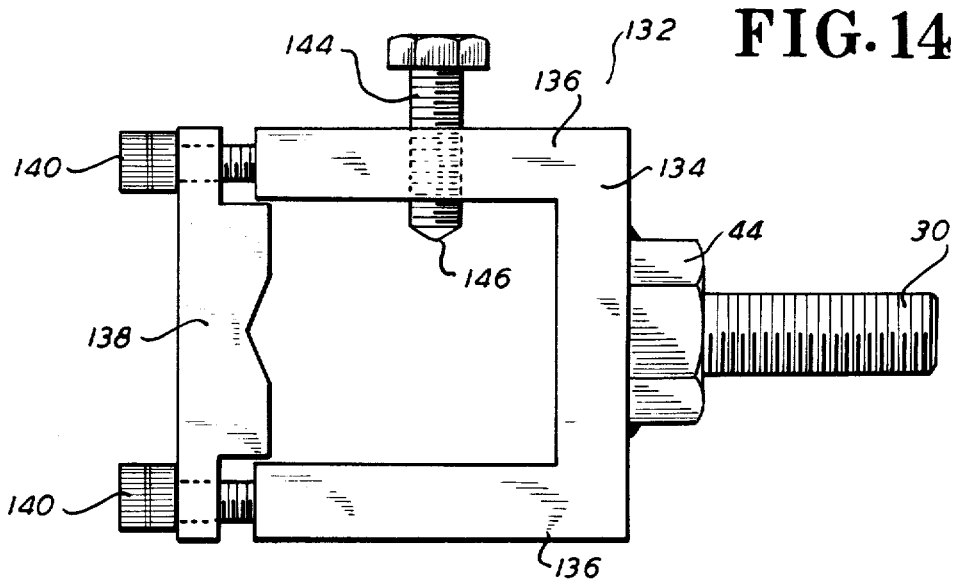
FIG. 14 is a perspective view of a universal type, rectangular safety barrier clamp in which the base means and two side means form a single, continuous U-shaped member.
Figure 15:
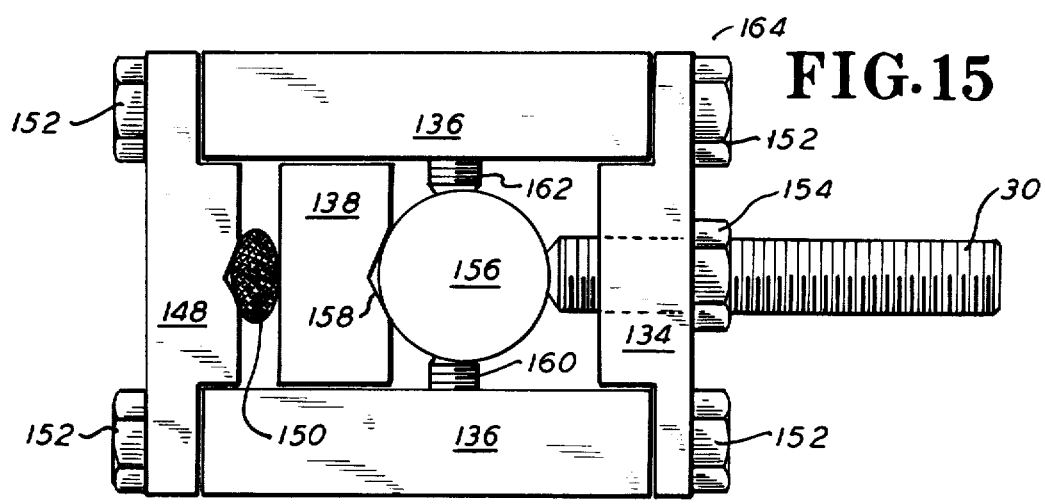
FIG. 15 is a perspective view of the universal rectangular safety barrier clamp in which the side means are attached to the end and base means via bolts.

The universal safety barrier clamp shown in FIG. 15 is similar in many respects to the clamp illustrated in FIG. 14, but is more versatile in its applications. This versatility comes in part from the fact that the side means 136 are not continuous with the base means 134, and therefore may be articulated in order to fit around an unusual size support. The universal clamp of FIG. 15 also includes a pressure plate 148 which may be used to pinch or hold a rope 150 as shown in cross sectional view. A plurality of hex headed bolts 152 are employed to attach the base means 134 and the pressure plate 148 to the side means 136 respectively. The threaded stud 30 is threadably received in the base means 134 and lockable therein by means of lock nut 154. According to the embodiment shown in FIG. 15 the threaded stud 30 extends through the base means 134 and impinges upon the support means 156. Support means 156 is shown in FIG. 15 to be a round column, but it is to be understood that the support means could be square or almost any other shape. As stud 30 is tightened against column support 156, the support in turn is forced up against end block 138 and thereby held securely. The notch 158 helps to guide and seat column type supports such as 156 against the end block 138. Support 156 is typically a pipe with a 1⅝ inches diameter. Additional pressure may be brought to bear on pipe 156 by plate 134 which is drawing against pipe 156 by means of tightening bolts 152. Additional clamping security can be obtained through the use of inset, Allenhead screws 160. Screws 160 are inset into the side means 136 and may be seen in the side view of FIG. 16. End block 138 is secured to side means 136 by pair of Allenhead screws 162, one of which is seen in the side view of FIG. 16. The advantage of insetting the Allenhead screws 160 and 162 is that they are more difficult to accidentally or purposefully dislodge.

Figure 16:
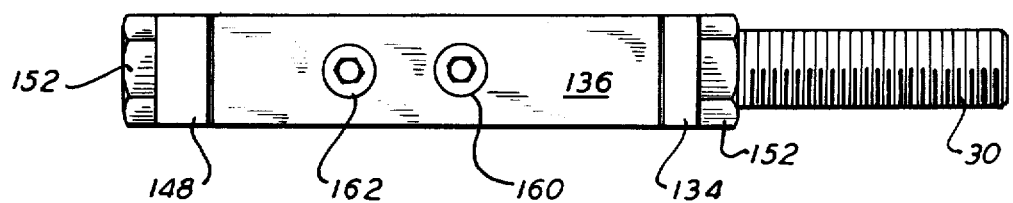
FIG. 16 is a side elevation of the universal, rectangular safety barrier clamp of FIG. 15.

It will be appreciated that the universal clamp shown in FIGS. 15 and 16 can be attached to a support means of almost any configuration subject only to the restrciton that it fit within the cavity bounded by elements 134, 136 and 138. This particular embodiment, referred to as universal clamp 164, is securable to a support either by means of the threaded stud 130 or through the use of Allenhead bolts 160 or by the use of both together. Clamp 164 has the additional feature of being able to grab or pinch a cord 150 between elements 138 and 148. Besides being very strong, Clamp 164 also has the virtue that it is easy to assemble and disassemble and otherwise appears to meet the OSHA regulations as previously discussed. In the embodiment of clamp 164 shown in FIGS. 15 and 16, the lock nut 154 is not integral with the threaded stud 30. However, this need not be the case, and lock nut 154 can be manufactured as a continuous part of threaded stud 30. In this case, the lock nut 154 serves as a point of purchase to which a tightening tool can be applied.

Figure 17:
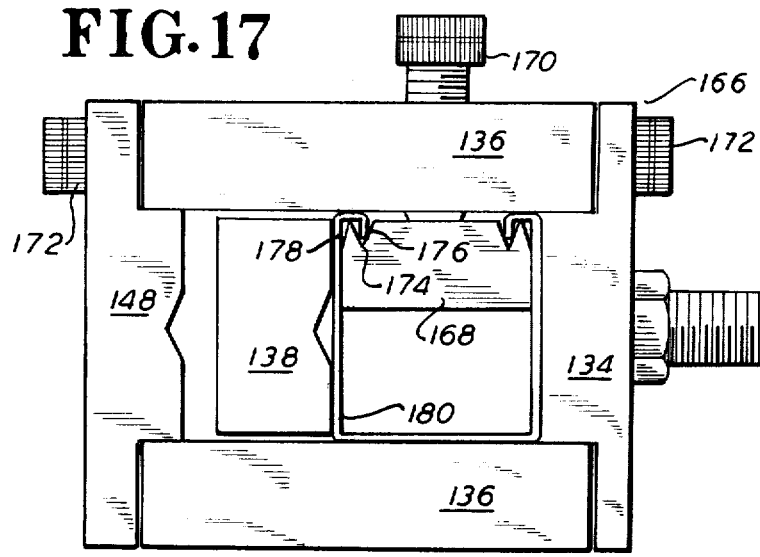
FIG. 17 is a perspective view of the universal, rectangular safety barrier clamp in which a locking plate is used to secure a U-shaped strut to the clamp means.
Figure 18:
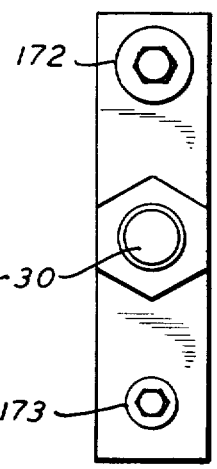
FIG. 18 is an end view of the universal, rectangular safety barrier clamp of FIG. 17.

A universal clamp 166 as illustrated in FIGS. 17 and 18, includes the use of a locking plate 168 and a locking plate bolt 170 in place of the Allenhead screws 160 of the universal clamp illustrated in FIGS. 15 and 16. Additionally, hex headed bolts 152 of clamp 164 have been replaced in part by a pair of Allenhead bolts 172 and a pin 174 which may be seen in FIG. 18. It will be understood that hex headed bolts 152, Allenhead bolts 172, or pins of the like, may be used interchangeably for securing elements 134, 136, and 148 together. The advantage of a pin 174 is that it cannot be removed. If the tightening means are loose enough prior to applying the universal clamp to a support, it is possible to pivot or swing the elements away from one another, thereby making it relatively easy and simple to attach the clamp to a support. In general, it is only necessary to remove one bolt in order to connect the clamp to the support.

FIG. 17 illustrates the use of universal clamp 166 in the context of a U-shaped strut support. Note that a special locking plate is employed in this context in which the depth of the plate grooves 174 is slightly greater than the effective height of the turned-in ridges 176 of the U-shaped strut. This feature causes the tips 178 of the plate to impinge against the strut thereby improving its bite on that member. Locking plate 168 is drawn up against the U-strut 180 by means of the locking plate bolt 170.

Figure 19:
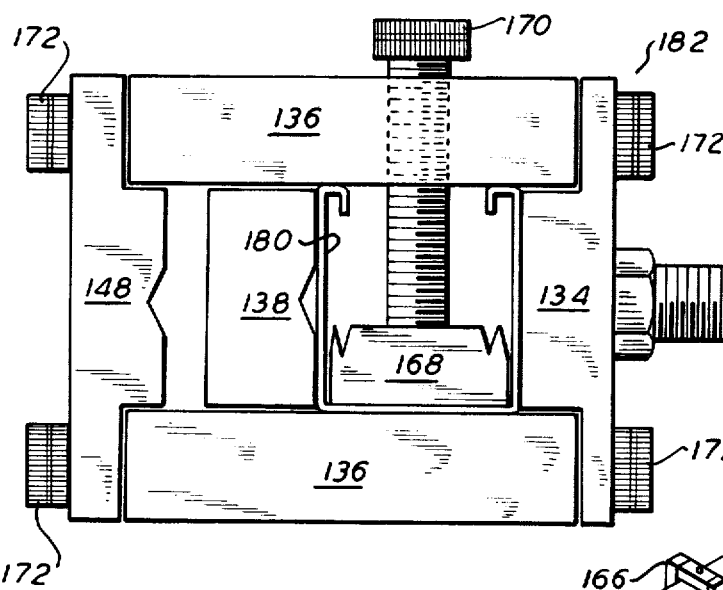
FIG. 19 is a perspective view of the universal, rectangular safety barrier clamp in which the locking plate is used as a pressure plate to secure the clamp to the Unistrut support.
Figure 20:
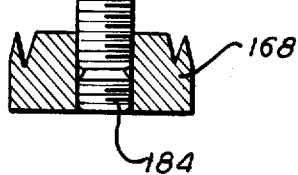
FIG. 20 is a cross-sectional view of the locking plate means when used as a pressure type plate.

A modified version of the universal clamp 166 of FIGS. 17 and 18 is illustrated in FIGS. 19 and 20. According to that view, pin 174 has been replaced by another pair of Allenhead bolts 172, but it will be appreciated that a pin could have been just as successfully employed in this embodiment. In this embodiment the locking plate 168 is used in a pushing rather than a pulling mode in order to secure the clamp to the U- shape ... Therefore, bolt 170 is screwed down as far as possible until locking plate 168 abuts up against the bottom inner surface of U-shaped strut 180. In order to prevent bolt 170 from simply screwing into locking plate 168 once locking plate 168 bottoms against U-shape strut 180, a locking plate plug 184 is employed to prevent the further travel of bolt 170 into locking plate 168. This feature may be seen in further detail in the cross sectional view of FIG. 20.

The advantage gained by making a "break over" or articulatable type of universal clamp is that it makes it relatively easy to inert locking plate 168 into the interior of channel 180. Generally, all that is necessary to do to install the clamp shown in FIGS. 17-20 is to remove one of the bolts 17 and swing the rest of the assembly out of the way. The locking plate 168 can then be inserted into the channel; the bolt 172 is replaced; and the whole assembly is then tightened up against channel 180.

It will be appreciated from the views of FIGS. 17 through 20 that the locking plate can be used in either a pushing or a pulling mode depending upon whichever mode gives the best clamping purchase. The pushing mode may be desirable in certain circumstances where a quicker connection to the support is contemplated. It is easier to use the locking plate 168 in the pushing mode because it is not necessary in that case to align the grooves 170 with the turned-in ridges 176 of the U-strut of 180. Clamps 166 and 182 are also universal in the sense that the barrier to which they may be attached can either be a bar, in which case they are attached to the threaded stud 30, or it may be a cord or rope, in which case it is pinched between element 138 and 148.

Figure 21:
FIG. 21 is a perspective view of the safety barrier using the universal, rectangular type clamp in place on a stairway.

A safety barrier employing a universal clamp such as that shown in FIGS. 17 and 18 is illustrated in general detail in FIG. 21.

While the universal clamp of FIGS. 14-21 is shown as being attached to a U-shaped strut 180 or a pipe support 156, the barrier clamp is not necessarily limited to those kinds of supports. For instance, by removing pressure plate 148 and end plate 138, it is possible to attach the universal barrier clamp to a ledge-like protrusion, provided that the ledge fits within the cavity bounded by remaining elements 134 and 136. The clamp is aptly called a universal barrier clamp because it can be employed to attach a barrier to a very wide variety of diverse supports.

In a general manner, while there has been disclosed effective and efficient embodiments of the invention, it should be well understood that the invention is not limited to such embodiments as there might be changes made in the arrangement, disposition, and form of the parts without departing from the principal of the present invention as comprehended within the scope of the accompanying claims.

I claim:

1. A portable safety barrier for preventing access to a restricted passageway comprising:
    a bar means adapted to extend substantially across said passageway; and,
    a clamp connected to at least one end of said bar means, said clamp having a generally rectangular shape and including at least a base means adapted for attachment to said bar means, a pair of side means attached to said base means and an end plate means attached to said side means at the end of said clamp furthest removed from said base means, and
    at least one screw urged means for securing said clamp to a support means, said screw urged means comprising a threaded bolt means, a locking plate attachable to said threaded bolt means and a locking plate plug means receivable in said locking plate,
    wherein said threaded bolt means passes through one of said side means and is threadably receivable in said locking plate means, the depth of penetration of said threaded bolt means into said locking plate means being determined by the locking plate plug means, whereby said locking plate may be urged against a flat section of said support means by said threaded bolt means, thereby securing said clamp to said support means.

2. A portable safety barrier for preventing access to a restricted passageway comprising:
    a bar means adapted to extend substantially across said passageway; and,
    a clamp connected to at least one end of said bar means, said clamp having a generally rectangular shape and including at least one base means adaptable for attachment to said bar means, a pair of side means attached to said base means and an end plate means attached to said side means, said end plate means also including a notch therein for providing a better purchase on a column-type support;
    at least one screw urged means connected to said clamp for securing said clamp to a support means; and,
    a pressure plate substantially parallel to said end plate means and located on the opposite side of said end plate means fron said base means, said pressure plate having two holes therein through which a pair of threaded bolts may pass, said bolts being respectively receivable in said pair of side means,
    wherein a cord means may be secured to said clamp by threading said bolts into said side means thereby pinching said cord means between said pressure plate and said end plate means.

3. The invention of Claim 2 wherein said pressure plate includes a slight V-shaped notch means for more easily pinching said cord means.

4. The invention of Claim 2 wherein said base means and said side means form a generally U-shaped continuous piece of metal.

5. The invention of Claim 2 wherein said base means, side means and end means are attached together by a plurality of threaded bolt means.

6. The invention of Claim 2 wherein said screw urged means comprises a threaded screw having a pointed tip and being receivable in a threaded hole in said side means,
    wherein said clamp may be secured to a support means by screwing the point of said screw urged means into said support means.

7. The invention of Claim 2 wherein said support means is a U-shaped strut member having turned-in ridges at the open end of said strut;
    said screw urged means comprising a threaded bolt and a locking plate receivable by said bolt, said locking plate including ridge engaging grooves located therein;

wherein rotary pressure applied to said bolt will urge said ridges into engagement with the ridge engaging grooves of said locking plate thereby securing said clamp to said strut.

8. The invention of claim 7 wherein the depth of said ridge engaging grooves in said locking plate is greater than the effective height of said turned-in ridges.

* * * * *